United States Patent Office 3,591,682
Patented July 6, 1971

3,591,682
AMINOALKYL PHOSPHITE FUNGICIDES AND
USE THEREOF IN AGRICULTURE
Jean Thiolliere, Lyon, France, assignor to Pechiney-Progil, Societe pour le Developpement et La Vente de Specialites Chimiques, Lyon, France
No Drawing. Filed Apr. 22, 1968, Ser. No. 723,282
Claims priority, application France, Apr. 20, 1967, 48,557
Int. Cl. A01n 9/36
U.S. Cl. 424—211     1 Claim

ABSTRACT OF THE DISCLOSURE

A fungicidal composition containing as the active ingredient a compound having the empirical formula

corresponding to the tautomerical formulae:

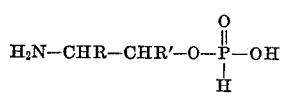

and/or

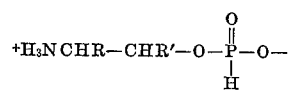

and/or

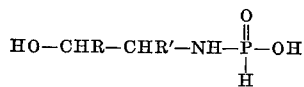

where R and R' are hydrogen or an alkyl radical, and the method of protecting plants against fungicidal attack by use of same.

---

The present invention relates to pesticidal compositions, in particular to fungicidal compositions in which the active materials are organic phosphorus derivatives.

It has long been known to use organic phosphorus derivatives as pesticides. See for instance Metcalf—Organic Insecticides: Their Chemistry and Mode of Action—chap. XI, p. 251 (Interscience Publishers New York).

Heretofore, however, such products have been used in general for fighting against arthopods, mites, nematodes and, more broadly, against parasites belonging to the animal kingdom.

Now it has been found that some organic phosphorus compounds have fungicidal properties, which make them adapted for fighting against parasitical fungi, in particular against those which grow on and/or in plants, crops, or stored or worked up materials.

Said organic phosphorus derivatives have the empirical formula

where R and R' are hydrogen or an alkyl radical.

As disclosed in the French Pat. No. 1,299,543, filed on Apr. 28, 1961, and describing the method of preparation of said materials, the latter may be represented very likely by one of the following formulae:

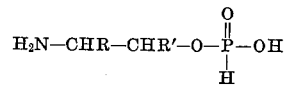

and/or

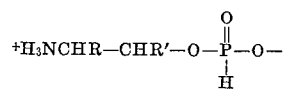

and/or

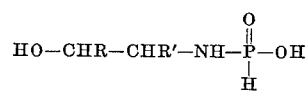

where R and R' are hydrogen or an alkyl radical, as mentioned previously.

The fungicidal properties of one of the products according to the invention will be shown up in the following examples.

Said product, which has the empirical formula

is obtained from dimethyl phosphite and monoethanoamine, according to the method described in Example 1 in the French patent mentioned hereinabove and hereinafter reproduced. Its melting point is 200° C.

EXAMPLE 1

A mixture of 317 grams monoethanolamine and 90 grams water has been introduced drop by drop under agitation into 550 grams dimethylphosphite preheated to 80° C. The temperature is allowed gradually to rise to 120° C., the trans-esterified methanol has been redistilled. After all of the mixture of monoethylamine and water was introduced, the reaction vessel was gradually heated to 160° C. and the methanol was allowed to distill off. After having maintained the temperature at 160° C. for one hour, the vessel was cooled to about 100° C. Then a vacuum at absolute mercury pressure of 15 mm. is established and the mixture was progressively heated under vacuum to 160° C. When this temperature was attained, the mixture again was cooled to 100° C.; then the product was poured rapidly into 800 grams methanol, then cooled and filtered. A crystallized, white product weighing 362 grams was obtained, whose analysis compared to that of a body of the formula $C_2H_8O_3NP$, produced the results shown below.

Found (percent): C, 19.5; H, 6.98; N, 10.8; P, 24.4.
Calculated according to formula $C_2H_8O_3NP$ (percent): C, 19.2; H, 6.4; N, 11.2; P, 24.9.
Yield: 58% of the theory
Melting point: 203° C. (±3°)

The plants are treated with a wettable powder prepared from an aqueous suspension containing 20% of the product under test, diluted so as to bring its concentration to 2 g./l. of active material.

The plants are then infected with spores of the fungus selected, and the development of the disease is observed.

Under such conditions, the product having the empirical formula $C_2H_8NO_3P$ insures a good protection against *Alternaria solani* and *Septoria apii*.

EXAMPLE 2

The same product was tested in the open air on vine lots, with a view to determining its activity against *Plasmopara viticola*, a fungus which is the cause of vine mildew. A very good protection against mildew was insured until the end of the season by using said product in an amount of 200 g./hl.

Under the same conditions, but using "zinebe" [zinc-(ethylene bis-dithiocarbamate)], a fungicide very widely used in the present art, a double dose, that is, 400 g./hl., was necessary for achieving a similar protection.

The products according to the invention may be used in the pure state, but in most cases they will be formulated in a manner such as to make their practical use easier, as regards storing, transportation, handling, and/or application to plants.

They may be used as powders (for dust or water dispersible) in which case active materials are dilute in inert carriers, such as clays (kaolinites, bentonites, attapulgites), talc, pyrophyllite, quartz, diatomite, Fuller's earth, chalk, gypsum, phosphates, carbonates, silica, and the like.

They may also be used as solutions or dispersions in organic vehicles, such as the usual solvents (alcohols, ketones, cyclic hydrocarbons, halogenated cyclic hydrocarbons, dimethylsulfoxide and the like) in oils, or in water or a direct or inverted emulsion of oil in water or water in oil.

The addition of various adjuvants, such as dispersing, wetting, spreading, anticaking agents, and the like, to the liquid or solid diluent for the active material, is also frequently necessary, in order to obtain a better suspension, dispersion, stickiness and penetration of the formulations produced.

The selection of a suitable formulation depends on the use contemplated therefor, as well as on economic factors. Particulars about such problems will be found in numerous works, and in particular in the book "Fungicides" (Ed. E. Torgeson)—Chap. 6, p. 153.

It will be understood that changes may be made in the formulations without departing from the spirit of the invention, especially as defined in the following claims.

I claim:
1. A method for controlling fungi on a plant comprising applying to said plant a fungicidally effective amount of an aminoalkyl phosphite having the empirical formula:

corresponding to tautomerical formulae selected from the group consisting of

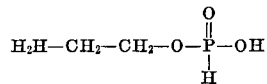

and

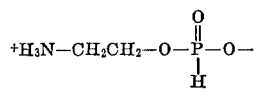

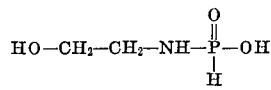

References Cited
UNITED STATES PATENTS
3,160,632  12/1964  Toy et al. _____ 424—211

FOREIGN PATENTS
1,299,543  4/1961  France.

ALBERT T. MEYERS, Primary Examiner
V. D. TURNER, Assistant Examiner

U.S. Cl. X.R.
424—217